US008971308B2

(12) United States Patent
Karlsson

(10) Patent No.: US 8,971,308 B2
(45) Date of Patent: Mar. 3, 2015

(54) CALL ADMISSION CONTROL IN VOIP SYSTEMS

(75) Inventor: Nils Karlsson, Luoma (FI)

(73) Assignee: Unwired Planet, LLC, Reno, NV (US)

( * ) Notice: Subject to any disclaimer, the term of this patent is extended or adjusted under 35 U.S.C. 154(b) by 951 days.

(21) Appl. No.: 10/556,654

(22) PCT Filed: May 16, 2003

(86) PCT No.: PCT/EP03/50172
§ 371 (c)(1),
(2), (4) Date: Nov. 12, 2005

(87) PCT Pub. No.: WO2004/102919
PCT Pub. Date: Nov. 25, 2004

(65) Prior Publication Data
US 2006/0251050 A1  Nov. 9, 2006

(51) Int. Cl.
*H04L 12/66* (2006.01)
*H04L 29/06* (2006.01)
*H04L 12/54* (2013.01)
*H04L 12/801* (2013.01)
*H04L 12/911* (2013.01)
*H04M 7/12* (2006.01)
*H04J 3/17* (2006.01)

(52) U.S. Cl.
CPC .......... *H04L 65/104* (2013.01); *H04L 12/5695* (2013.01); *H04L 29/06027* (2013.01); *H04L 47/15* (2013.01); *H04L 47/745* (2013.01); *H04L 47/788* (2013.01); *H04L 47/822* (2013.01); *H04L 47/826* (2013.01); *H04L 65/80* (2013.01); *H04M 7/1285* (2013.01); *H04L 65/1069* (2013.01); *H04L 65/103* (2013.01)
USPC ............................ 370/352; 370/238; 370/435

(58) Field of Classification Search
None
See application file for complete search history.

(56) References Cited

U.S. PATENT DOCUMENTS 6,542,499 B1 *   4/2003   Murphy et al. ............... 370/352
6,876,627 B1 *   4/2005   Rao ............................. 370/230
(Continued)

FOREIGN PATENT DOCUMENTS

| JP | 2001-230862 | 8/2001 |
| JP | 2002-118648 | 4/2002 |
| JP | 2002-141935 | 5/2002 |
| JP | 2002185515 | 6/2002 |
| JP | 2003-008641 | 1/2003 |

(Continued)

OTHER PUBLICATIONS

Szabo I: "Performance Evaluation of a New End-to-End Measurement Based Call Admission Control Scheme for Supporting IP Telephony" Proceedings of the 2001 International Symposium on Performance Evaluation of Computer and Telecommunication Systems, Jul. 15-19, 2001, pp. 498-505, XP009020891, Florica, ISBN: 1-56555-240-7.

(Continued)

Primary Examiner — Ayaz Sheikh
Assistant Examiner — Sori Aga
(74) Attorney, Agent, or Firm — Nixon & Vanderhye P.C.

(57) ABSTRACT

A method of controlling call admission within a system comprising a plurality of media gateways (8, 9) interconnected by a packet switched backbone (5). The method comprises, at least one media gateway (8, 9), monitoring the level of congestion suffered by incoming packets to that gateway from each other media gateway over said backbone. Following receipt of a request for a media gateway (8, 9) to terminate a bearer extending over said backbone (5) from a peer media gateway, making a decision on the admissibility of that request based upon the previously monitored level of congestion suffered by incoming packets from that peer media gateway.

19 Claims, 3 Drawing Sheets

(56) References Cited

U.S. PATENT DOCUMENTS

| | | | |
|---|---|---|---|
| 7,088,677 B1* | 8/2006 | Burst, Jr. | 370/229 |
| 2003/0053463 A1 | 3/2003 | Nylander et al. | |
| 2003/0107991 A1* | 6/2003 | Tezuka et al. | 370/229 |
| 2003/0118011 A1* | 6/2003 | Wu et al. | 370/356 |

FOREIGN PATENT DOCUMENTS

| WO | WO 00 72624 A | 11/2000 |
|---|---|---|
| WO | WO 0072624 | 11/2000 |

OTHER PUBLICATIONS

Szabo I: "Performance Evaluation of a New End-to-End Measurement Based Call Admission Control Scheme for Supporting IP Telephony" Proceedings of the 2001 International Symposium on Performance Evaluation of Computer and Telecommunication Systems, Jul. 15-19, 2001, pp. 498-505, XP009020891 Florida ISBN: 1-56555-240-7 p. 498, left-hand column, paragraph 1—p. 500, left-hand column, paragraph 4.

* cited by examiner

CALL ADMISSION CONTROL IN VOIP SYSTEMS

This application is the U.S. national phase of International Application No. PCT/EP03/50172, filed May 16, 2003, which designated the U.S.

FIELD OF THE INVENTION

The present invention relates to call admission control in Voice over IP systems.

BACKGROUND TO THE INVENTION

There is a desire amongst the operators of communication networks to transport both signaling and user traffic using Internet Protocol (IP) systems. This is because such systems can often make more efficient use of bandwidth than conventional systems such as those using circuit switched data links (e.g. TDM) and, perhaps more importantly, because the infrastructure associated with IP systems can be cheaper than the equipment required to implement conventional systems.

The term "IP backbone" is often used to denote an IP system used to interconnect various different types of subscriber access networks. The backbone can be thought of as providing "trunk" links between the access networks. The access networks themselves may themselves provide packet switched connections between subscribers and the IP backbone (e.g. in the case of GPRS access networks associated with cellular telephone networks), or may provide circuit switched connections (e.g in the case of Public Switched Telephone Networks (PSTN) and GSM and 3G voice networks).

As already mentioned, signalling and user data may be carried over an IP system such as an IP backbone: in the case of user data this is often referred to as Voice over IP (VoIP). However, a sometimes preferred mechanism is to carry user data over the IP backbone, and to carry signalling data over an SS7 network, the reason being that transmission over the IP network may be less reliable than that over an SS7 network. In order to allow for maximum flexibility, the Internet Engineering Task Force (IETF) has provided for the decomposition of gateways at network interfaces into Media Gateways (MGw:s) and Media Gateway Controllers (MGCs). The role of the MGw is to establish bearers for user data over the prescribed bearer network (e.g. the IP backbone). The role of the MGC is to handle call setup and control with peer MGCs (MGCs within the same communication plane), and to control one or more associated MGw:s so as to establish the bearers required for a negotiated call. A protocol known as the Gateway Control Protocol (GCP) has been defined for signalling over the interface between the media gateway controller and the media gateway.

FIG. 1 illustrates schematically a network belonging to a mobile operator. The network comprises an IP backbone 5, and a pair of WCDMA mobile access networks. A first of these networks 2 is located in a first geographical area ("Helsinki") whilst a second of the access networks 4 is located within a second geographical area ("Turku"). Telephony traffic between the Helsinki mobile network and the Turku mobile network traverses an IP backbone 5, as does traffic exchanged between other pairs of mobile networks not shown in the Figure. The Helsinki area is also served by a first fixed line network or PSTN 1, whilst the Turku area is served by a second PSTN 3. The PSTN networks are coupled to respective mobile networks.

FIG. 1 illustrates by way of example a call originating in the Turlcu PSTN 3 which terminates at a mobile located within the Helsinki area. The call enters the mobile operator's network at the site Turlca, and Call servers (GMSC 6 and MSC 7) route the call from Turku to Helsinki and instruct the MGw:s at those sites to set up and handle the IP media bearers between the sites (in each direction, one of the MGw:s initiates a bearer and the other terminates the bearer). In this respect the call servers act as media gateway controllers for respective media gateways 8,9 (according to the IETF decomposition model). The IP backbone 5 contains a number of interconnected routers, although in FIG. 1 only the edge, or site routers 10,11 are shown.

The connectionless nature of the IP backbone 5 creates the problem of how to guarantee that there is enough capacity in the network to deliver a call between sites with a sufficient QoS. The call servers (MSC and GMSC) do not know the structure, capacity or traffic distribution within the backbone, and are typically set up to allow a certain volume of calls between the two sites. This does not guarantee however that there will always be capacity for this amount of calls between the sites. Routers and links in the IP backbone can be overloaded due to traffic between other sites sharing a common link. Routers and links in the backbone may also become non-operational due to failures, reducing the traffic carrying capacity of the backbone.

A protocol known as Resource Reservation Setup Protocol (RSVP) has been defined by the IETF for allowing resources to be reserved over an IP network. A MGw uses RSVP to establish a call connection having some specified Quality of Service (QoS). RSVP is generally applied on a per call basis, and results in the creation of state tables at network routers. In view of the large number of sessions which a router may be handling, the resulting increase on processing requirements is undesirable.

Call admission control mechanisms have been proposed which operate at the bearer level to limit the number and type of calls set up over the bearer network in an attempt to avoid overloading the bearer network. In a typical scenario, one of a pair of peer MGw:s (located in the same operating plane) is responsible for setting up a bi-directional bearer to the other MGw. MGw:s receive congestion reports from other MGw:s and make decisions on call admissibility accordingly.

SUMMARY OF THE INVENTION

According to a first aspect of the present invention there is provided a method of controlling call admission within a system comprising a plurality of media gateways interconnected by a packet switched backbone, the method comprising the steps of:

at at least one media gateway, monitoring the level of congestion suffered by incoming packets to that gateway from other media gateways or groups of media gateways over said backbone; and following receipt of a request for said at least one media gateway to terminate a bearer extending over said backbone from a "peer" media gateway, making a decision on the admissibility of that request based upon the previously monitored level of congestion suffered by incoming packets from that peer media gateway or from a group of gateways comprising that peer gateway.

In a typical call scenario, a bi-directional link must be established between peer media gateways. Said step of making a decision on the admissibility of a request is therefore carried out at both media gateways.

The step of monitoring the level of congestion suffered by incoming packets to a gateway may comprise examining packets received at that gateway to determine whether or not they contain a congestion notification flag. All or only a proportion of incoming packets may be examined for this purpose. Congestion notification flags may be incorporated into a packet header by a router of the backbone forwarding that packet, when the router experiences congestion.

The step of monitoring the level of congestion suffered by incoming packets to a gateway may comprise monitoring the rate at which packets are dropped. This may be achieved by determining the order at which incoming packets are received with respect to packet sequence numbers, and identifying missing or out of sequence packets.

The step of monitoring the level of congestion suffered by incoming packets to a gateway may comprise a combination of the method described in the two preceding paragraphs.

Other methods of monitoring congestion may be employed. For example the "jitter" or fluctuations in an incoming packet stream may be monitored and used to monitor congestion.

The step of monitoring the level of congestion suffered by incoming packets to a gateway may comprise associating incoming packets or packet sequences with an originating gateway, preferably based upon source addresses or parts of source addresses. The congestion level for a given peer to peer media gateway transfer may be determined based upon congestion data collected for all packets and/or packet sequences transported between the peer gateways.

Preferably, said packet switched backbone is an Internet Protocol (IP) backbone.

In certain embodiments, said step of making a decision on the admissibility of a request for a media gateway to terminate a bearer, comprises making that decision at the media gateway. In alternative embodiments, the decision may be made at the media gateway controller controlling said at least one media gateway. Monitored congestion levels are signalled to the media gateway controller by the media gateway.

According to a second aspect of the present invention there is provided a media gateway arranged to control call admission within a system comprising a plurality of media gateways interconnected by a packet switched backbone, the media gateway comprising:
  means for monitoring the level of congestion suffered by incoming packets to that gateway from other media gateways or groups of media gateways over said backbone;
  means for receiving a request for that media gateway to terminate a bearer extending over said backbone from a "peer" media gateway; and
  means coupled to the monitoring means and receiving means for making a decision on the admissibility of that request based upon the previously monitored level of congestion suffered by incoming packets from that peer media gateway or a group of media gateways containing that peer gateway.

According to a third aspect of the present invention there is provided a media gateway controller arranged to control call admission within a system comprising a plurality of media gateways interconnected by a packet switched backbone, the media gateway controller comprising:
  an interface towards at least one media gateway;
  means for receiving monitored congestion levels from the or each media gateway to which it has an interface, the monitored congestion levels being indicative of the congestion suffered by incoming packets to the or respective gateways from other media gateways or groups of media gateways over said backbone;
  means for receiving a call request requiring that a media gateway terminate a bearer extending over said backbone from a "peer" media gateway; and
  means coupled to both of the receiving means for making a decision on the admissibility of that request based upon the congestion level suffered by incoming packets from that peer media gateway or a group of media gateways containing that peer gateway.

According to other aspects of the present invention there are provided computer storage media storing computer programs for causing media gateways and media gateway controllers to implement the methods described above.

DETAILED DESCRIPTION OF A PREFERRED EMBODIMENT

Figure 1:
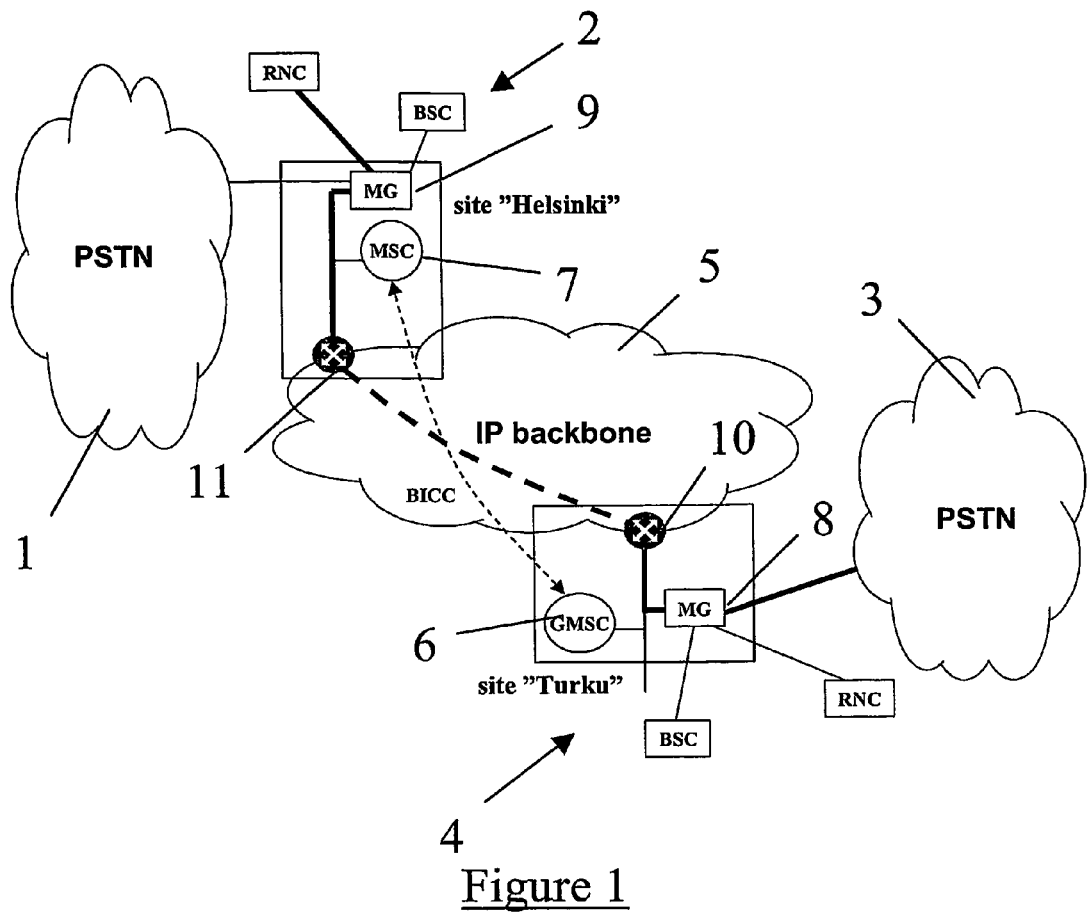
FIG. 1 illustrates a telecommunications system in which various access networks are interconnected via an IP backbone.

For the purpose of illustration, the general architecture of a telecommunications system shown in FIG. 1 and described above will now be referred to. As compared to the conventional architecture, in order to implement the invention, modifications to the functionality of the media gateways and, optionally, the media gateway controllers (i.e. MSC and GMSC) is required. Modifications to other network nodes are not required.

It is assumed that a call is initiated for example by a PSTN subscriber in Turku to a mobile subscriber in Helsinld. A call setup message (e.g. SS7 IAM) is sent from the appropriate local exchange within the Turku PSTN 3 to the GMSC 6 in Turku owned by the mobile operator. The setup message is relayed by the GMSC 6 to the MSC 7 in Helsinki. The GMSC and the MSC act as media gateway controllers for respective media gateways in order to establish bi-directional bearers over the IP backbone 5.

Figure 2:
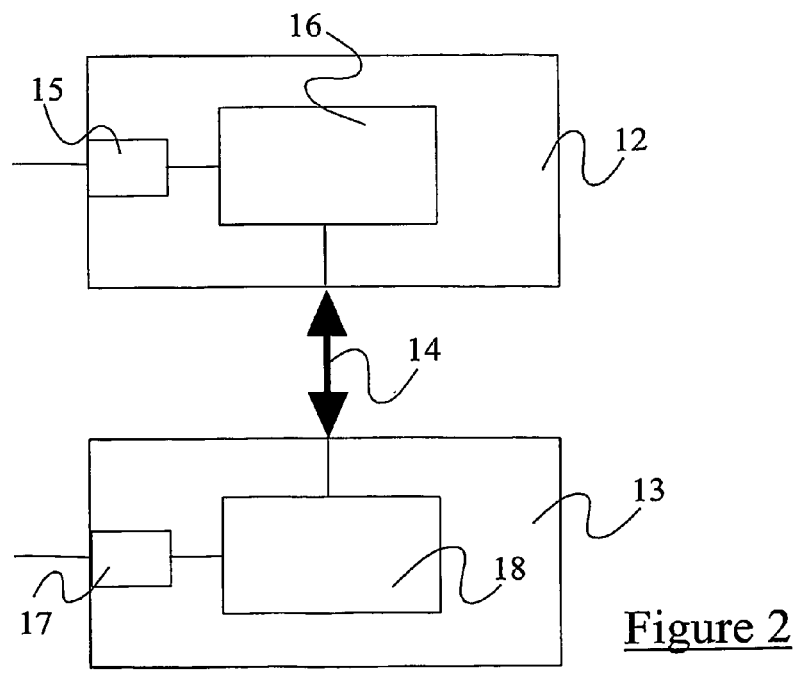
FIG. 2 illustrates a media gateway controller—media gateway pair for implementing an embodiment of the invention.

FIG. 2 illustrates a media gateway controller 12 and a media gateway 13 which is controlled by the media gateway controller via an interface 14. The media gateway controller has input/output means 15 which in use is coupled to other or "peer" media gateway controllers via an appropriate network (e.g. the IP backbone 5). The input/output means 15 is coupled to a main processor 16 of the media gateway controller. The main processor 15 controls the transfer of data over the interface 14. The media gateway 13 has input/output means 17 coupled in use to peer media gateways via the IP backbone 5. This input/output means 17 is coupled to a main processor 18 which is coupled to the interface 14.

Implementation of the present invention requires the use of a mechanism for detecting congestion on incoming bearers at media gateways. The following existing and well known mechanisms to detect congestion or near-congestion can be used, although other mechanisms could alternatively be used.

Explicit Congestion Notification (ECN)
  ECN (Explicit Congestion Notification) is an Internet technology defined in RFC 3168. The basic principle is to provide a "near-congestion" notification or flag in each IP packet sent over a link that is approaching congestion. The ECN is provided by the router that forwards a packet over a nearly congested link. The ECN indicator, once set, then travels with the packet to the destination MGw, providing the receiver with information that some part of the path from source to destination is approaching congestion.

The ECN indicator is part of the IP header and uses two spare bits in the field that is also carrying the Differentiated Services CodePoints (DSCP) associated with differentiated services. The ECN is therefore transported transparently by routers not supporting ECN.

(Early) packet drop

Implementation of Early packet drop results in a router starting to drop packets prior to the queue associated with a certain link and QoS becoming full, i.e. when the queue fill exceeds some predefined threshold value. (A router which has not implemented early packet drop will only drop packets when a queue is full.) The MGw receiving the packets associated with a certain stream will detect that some packets have been dropped. This detection is based on the sequence numbers in the Realtime Transport Protocol (RTP) packets or on some other mechanisms. Dropped packets will provide the receiver with information that some part of the path from source to destination media gateway is approaching congestion (early packet drop) or has reached congestion.

The packet loss rate estimate is calculated per remote site. It is assumed that the sites are organized as subnets, and thus it will be possible to identify the remote site by applying a subnet mask to the source IP address contained in a received packet. Since several IP address numbering plans can be used within one PLMN, the network id(s) and the related subnet mask(s) will be configurable in the media gateway so that the media gateway can apply an appropriate subnet mask to the remote IP address.

As the method of deciding upon the admissibility of a call described here treats all the IP addresses in one subnet in the same way, it will be concluded from dropped packets from certain of those IP addresses that the MGw terminating the bearer is not reachable from that subnet. Usually this will be the case. However, if load balancing or multipath routing is used between the sites, dropped packets from some IP addresses may indicate congestion for only a part of the site. In such routing scenarios the proposed admission control method may block traffic more than necessary. This problem can be overcome by using a more granular subnet mask allocation.

Packet loss is measured over successive fixed time periods, e.g. as a fraction of the total number of packets expected during each period, for each remote site. A moving average is then determined according to:

new estimate=$(1-w)$*old estimate+$w$*measured packet loss where w (weight) is a number in the range [0 . . . 1]. The exponential weight w should be chosen carefully. With a large w the estimate follows the measurement truly, but does not suppress peaks, whereas with a small w the peaks are suppressed but the estimate follows real changes only slowly. Therefore the weight is configurable by an operator via a user interface.

It is possible to use a combination of the ECN and Early packet drop mechanisms to monitor congestion in the IP backbone. For example, a packet arriving at a media gateway with the ECN indicator set can be regarded as a dropped packet, with the measured packet loss for a given remote site being the total number of dropped packets as a fraction of the number of expected packets (within a given period).

The monitored congestion levels are used by a media gateway to determine the admissibility of a request to establish an incoming bearer received from the associated media gateway controller. A preferred approach is as follows:

In order to avoid overloading the IP backbone, a media gateway receiving information that a "link" is congested or is about to be congested (using either the ECN or packet drop mechanisms) performs the following actions:

It starts a congestion control timer associated with the site from which the congested traffic is received. The site can be identified by the (sub)network number of the source IP addresses.

New call attempts that originate from the site from which the congested traffic was received are rejected for as long as the timer is running. This can be done as soon as the media gateway has received the IP address of the other media gateway. Exactly how and when the IP address is received and how calls are rejected depends on the detailed call setup scenario in use. As an example, the media gateway can obtain the remote IP address from the IPBCP Request or Accept message, depending on the bearer establishment direction.

New call attempts with a destination towards the site from which the congested traffic was received are rejected for as long as the timer is running. This can be done as soon as the media gateway has received the IP address of the other media gateway. Exactly how and when the IP address is received and how calls are rejected depends on the detailed call setup scenario in use.

The congestion control timer is restarted each time a new indication about congestion is received (ECN or packed drop) from the associated site.

If the congestion control timer expires, a gradual return to normal operation for that particular destination is carried out.

The result of these procedures will be that the traffic load between a remote site and the media gateway will automatically be reduced until the congestion state disappears. The traffic reduction depends entirely on calls being terminated by normal subscriber initiated release.

Note that all new traffic between the media gateway and the remote site will be rejected during the time that the congestion control timer is running. This is because telephony traffic is bi-directional and both media gateways are always involved in the call setup. So even if only one of the media gateways detects congestion and only in the receiving direction, all traffic between that media gateway and the remote site is affected, independent of call set up direction.

An alternative approach is to reject all call setup requests if the packet loss estimate is above a configurable Call Admission Control threshold value (i.e. no congestion timer is required). This requires that the media gateway send a GCP notification indicating 'unavailable resources'. The media gateway controller shall then take the appropriate action (e.g. play a congestion tone from TDM inter-working point, if possible, and tear down the call).

A requirement for the processes described here is that each media gateway is aware from where the media associated with a certain call will be coming, and that the media gateway is able to reject the call setup if so required. These conditions are fulfilled through the use of the BICC protocol and the IP Bearer Control Protocol (IPBCP) bearer setup associated with the call setup. These procedures are not described here in detail as they will be well known to the person of skill in the art.

Figure 3:
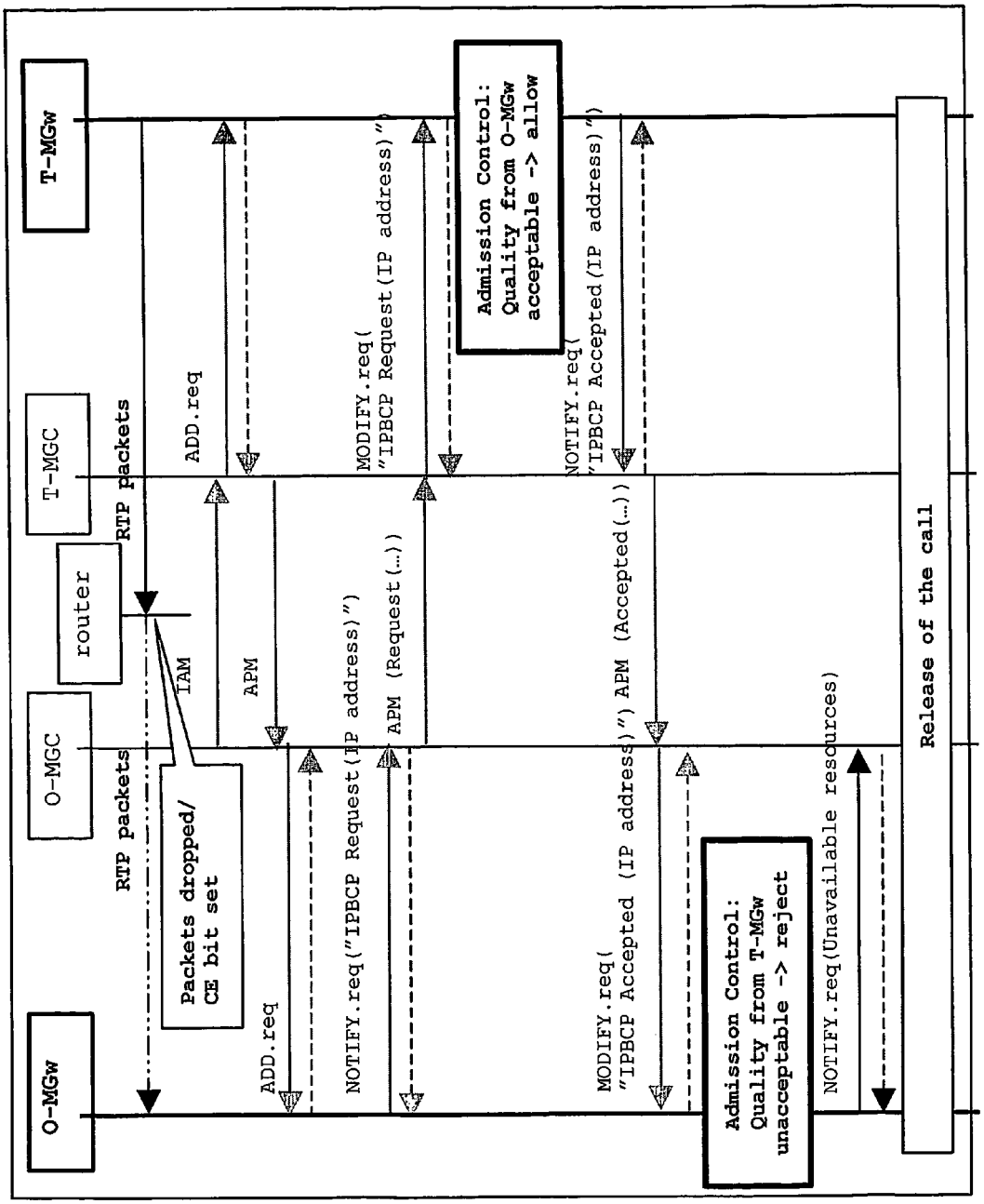
FIG. 3 illustrates signalling, associated with a call setup request, exchanged within the system of FIG. 1.

FIG. 3 illustrates signalling exchanged between the media gateways (MGw:s) and media gateway controllers (MGCs), where the prefixes "O" and "T" identify call originating and call terminating nodes respectively. The signalling is associated with a call setup request, and assumes that the IP Bearer Control Protocol (IPBCP) is used between media gateways to establish and control IP bearers over the IP backbone. In the example shown, as the call requires bi-directional bearers, a congestion level "check" is performed at both media gateways. Whilst the check at the terminating media gateway results in admission of the bearer setup request, the check at the originating media gateway results in rejection of the request. The call is thus released.

Figure 4:
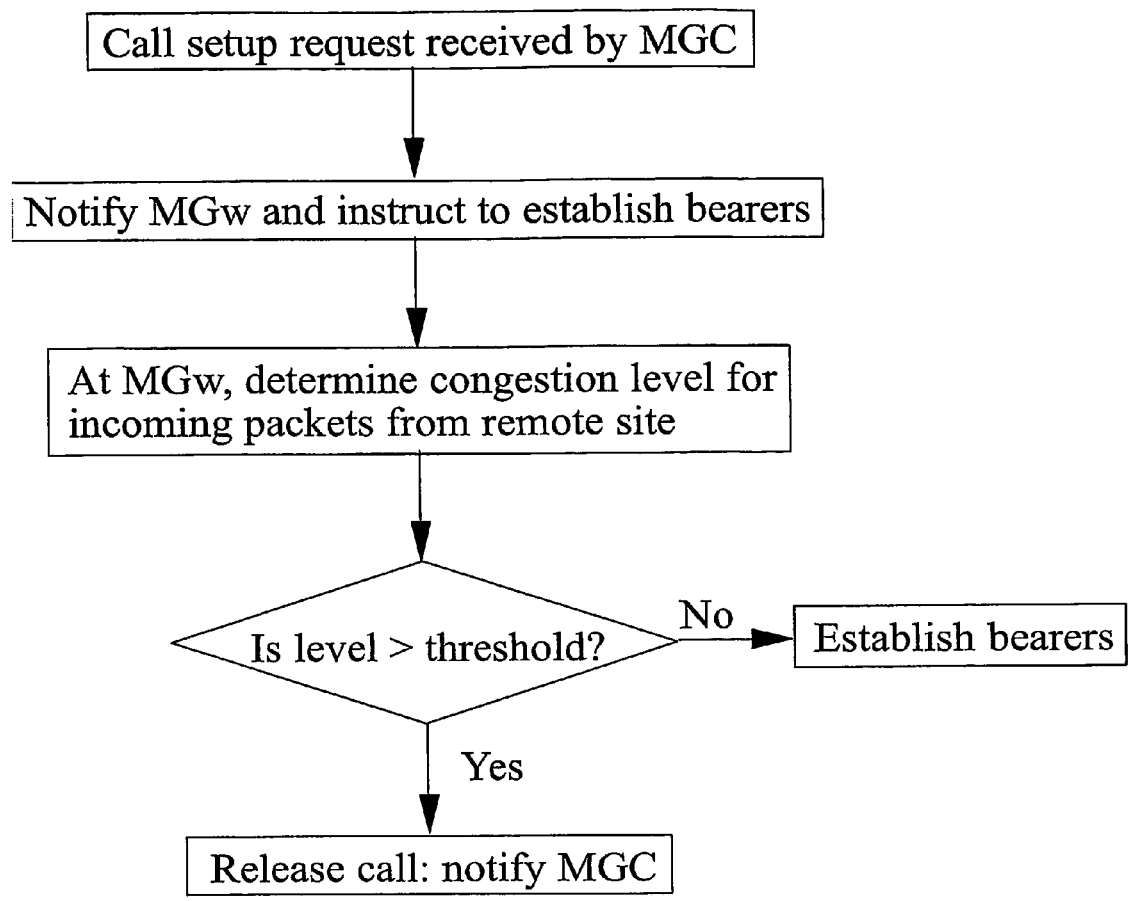
FIG. 4 is a flow diagram illustrating a method of operation of a media gateway of the system of FIG. 1.

FIG. 4 is a flow diagram illustrating the call admission procedure carried out at a media gateway controller/media gateway receiving a call setup request.

It will be appreciated by the person of skill in that art that various modifications may be made to the above described embodiments without departing from the scope of the present invention. For example, whilst congestion monitoring is performed at the media gateway level, the decision on the admissibility of calls may be made at the media gateway controller level rather than at the media gateway level. This would require that the media gateway report congestion levels to the associated media gateway controller.

The invention claimed is:

1. A method of controlling call admission within a system including a plurality of media gateways interconnected by a packet switched backbone, the method comprising the steps of:
monitoring a level of congestion suffered by incoming packets for a first media gateway, wherein said incoming packets are transmitted from a group of said plurality of media gateways over said backbone, wherein said first media gateway acts as a terminating media gateway for said group of media gateways, and wherein said group of media gateways is organized as a subnet and is identifiable by applying a specific subnet mask to an address in incoming packets from the group of media gateways;
receiving a request for said first media gateway to terminate a new bearer connection extending over said backbone from a second media gateway within said group of media gateways to said first media gateway;
making a decision on the admissibility of the request based upon a previously monitored level of congestion suffered by incoming packets transmitted from said group of media gateways to said first media gateway; and
rejecting or accepting said request based on said decision.

2. The method according to claim 1, wherein the step of monitoring comprises the step of:
examining said incoming packets to determine whether or not said incoming packets contain a congestion notification flag.

3. The method according to claim 1, wherein the step of monitoring comprises the step of:
monitoring a rate at which said incoming packets are dropped.

4. The method according to claim 3, wherein said monitoring further comprises the step of:
examining said incoming packets to determine whether or not said incoming packets contain a congestion notification flag.

5. The method according to claim 1, wherein the step of monitoring comprises the step of:
associating incoming packets or packet sequences with an originating gateway based upon source addresses or parts of source addresses.

6. The method according to claim 1, wherein said packet switched backbone is an Internet Protocol (IP) backbone.

7. The method according to claim 1, wherein said step of making said decision is made at said first media gateway.

8. The method according to claim 1, wherein said step of making the decision is made at a media gateway controller controlling said first media gateway, and wherein said monitored congestion level is signalled to the media gateway controller by the first media gateway.

9. A media gateway configured to control call admission within a system including a plurality of media gateways interconnected by a packet switched backbone, the media gateway comprising:
an input/output port coupled to a processor, the media gateway being configured to:
monitor a level of congestion suffered by incoming packets transmitted to the media gateway from a group of media gateways over said backbone, wherein said media gateway acts as a terminating media gateway for said group of media gateways, and wherein said group of media gateways is identifiable by applying a specific subnet mask to an address in incoming packets from the group of media gateways;
receive a request for the media gateway to terminate a new bearer connection extending over said backbone from a media gateway within said group of media gateways;
make a decision on the admissibility of the request based upon a previously monitored level of congestion suffered by incoming packets transmitted from said group of media gateways; and
reject or accept said request based on said decision.

10. A media gateway controller arranged to control call admission within a system including a plurality of media gateways interconnected by a packet switched backbone, the media gateway controller comprising:
an input/output port coupled to a processor,
an interface towards a first media gateway, the interface being coupled to the processor,
wherein the media gateway controller is configured to:
receive monitored congestion levels from said first media gateway, the monitored congestion levels being indicative of congestion suffered by incoming packets transmitted to said first media gateway from a group of said plurality of media gateways over said backbone, wherein said first media gateway is configured to act as a terminating media gateway for said group of media gateways and wherein said group of gateways is organized as a subnet and is identifiable by applying a specific subnet mask to an address in incoming packets transmitted to the from the group of media gateways;
receive a call request requiring that said first media gateway terminate a new bearer connection extending over said backbone from a second media gateway within said group of media gateways to said media gateway;
make a decision on the admissibility of the request based upon the congestion suffered by incoming packets for said first media gateway transmitted from said group of media gateways to said first media gateway; and
reject or accept said request based on said decision.

11. A non-transitory, computer-readable medium encoded with a computer program product for controlling call admission within a communication system including a plurality of media gateways interconnected by a packet switched backbone, the computer program product performs the following steps when run on a computer:
monitoring a level of congestion suffered by incoming packets for a first media gateway, wherein said incoming packets are transmitted from a group of said plurality of media gateways over said backbone, wherein said first media gateway is configured to act as a terminating media gateway for said group of media gateways, and wherein said group of media gateways is identifiable by applying a specific subnet mask to an address in incoming packets from the group of media gateways; and receiving a request for said first media gateway to terminate a new bearer connection extending over said backbone from a second media gateway within said group of media gateways to said first media gateway;

making a decision on the admissibility of the request based upon a previously monitored level of congestion suffered by incoming packets transmitted from said group of media gateways to said first media gateway; and rejecting or accepting said request based on said decision.

12. The method of claim 1, further comprising:
in response to detecting the level of congestion suffered by incoming packets exceeds a predetermined threshold, starting a congestion timer;
in response to receiving a subsequent indication of congestion, restarting said congestion timer; and
in response to receiving a subsequent request for said first media gateway to terminate said new bearer connection, rejecting the subsequent request before expiry of said congestion timer.

13. The method according to claim 3, wherein said monitoring comprises the step of monitoring the rate at which the incoming packets are dropped by the backbone.

14. The method according to claim 1, wherein said group is located at a site that is remote from the first media gateway.

15. The method according to claim 1, wherein the address is a source Internet Protocol, IP, address.

16. The method according to claim 1, comprising starting a congestion timer in response to detecting congestion.

17. The method according to claim 1, comprising making a decision to reject the request while the congestion timer is running.

18. The method according to claim 1, comprising:
receiving a request to set up a bearer to a media gateway in the group; and
making a decision to reject the request to set up the bearer to the media gateway in the group while the congestion timer is running.

19. The method according to claim 1, comprising restarting the congestion timer in response to detecting further congestion in relation to incoming packets received from the group of media gateways.

* * * * *

UNITED STATES PATENT AND TRADEMARK OFFICE
CERTIFICATE OF CORRECTION

| | | |
|---|---|---|
| PATENT NO. | : 8,971,308 B2 | Page 1 of 1 |
| APPLICATION NO. | : 10/556654 | |
| DATED | : March 3, 2015 | |
| INVENTOR(S) | : Karlsson | |

It is certified that error appears in the above-identified patent and that said Letters Patent is hereby corrected as shown below:

In the Specification

Column 2, Line 2, delete "Turlcu" and insert -- Turku --, therefor.

Column 2, Line 4, delete "Turlca," and insert -- Turku, --, therefor.

Column 4, Line 38, delete "Helsinld." and insert -- Helsinki. --, therefor.

Column 7, Line 3, delete ""0"" and insert -- "O" --, therefor.

Signed and Sealed this
Fourteenth Day of July, 2015

Michelle K. Lee
*Director of the United States Patent and Trademark Office*